Figure 5:
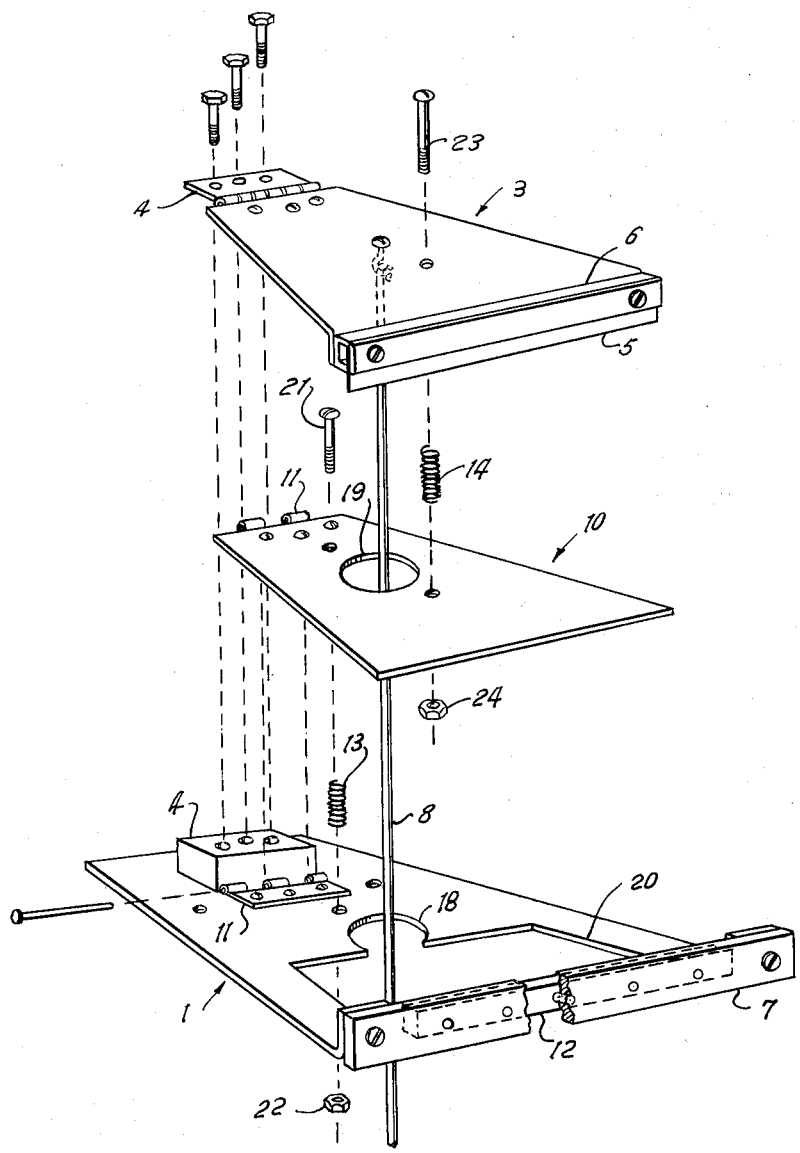

Oct. 26, 1965  J. W. RUCKER ETAL  3,214,317
PLASTIC BAG SEALER AND TRIMMER
Filed Aug. 5, 1963  2 Sheets-Sheet 1
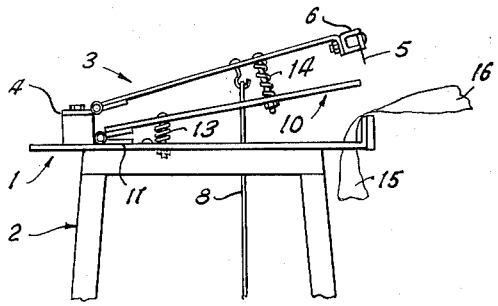
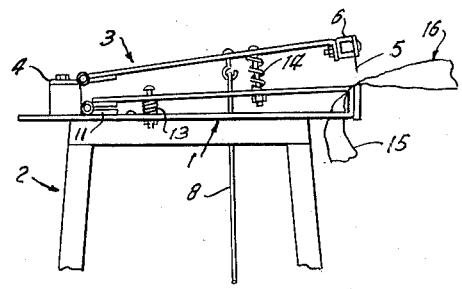
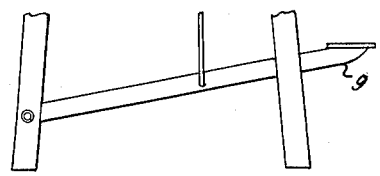
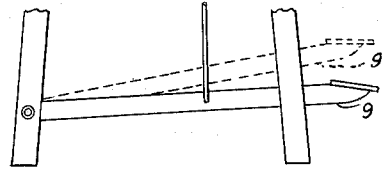
FIG. 1  FIG. 2
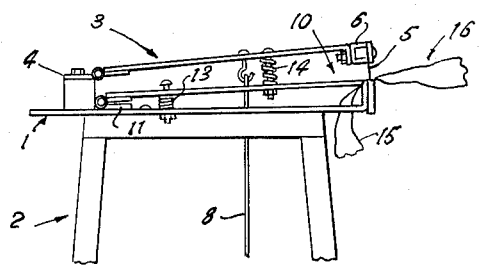
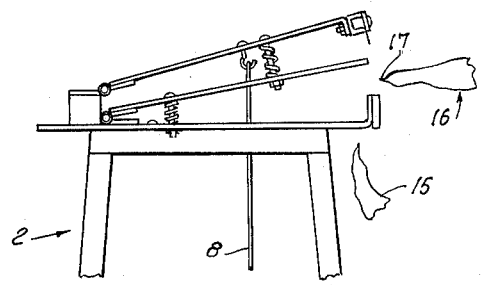
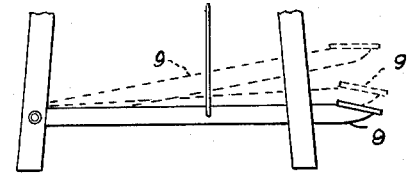
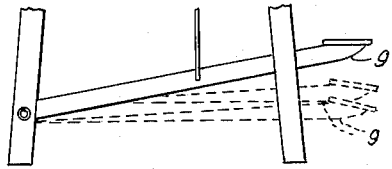
FIG. 3  FIG. 4
INVENTORS
J. W. Rucker
Paul Thomas
BY
ATTORNEY INVENTORS
J. W. Rucker
Paul Thomas

ATTORNEY 3,214,317
PLASTIC BAG SEALER AND TRIMMER
J. W. Rucker, 1105 Calhoun, Fort Worth, Tex., and Paul Thomas, Cleburne, Tex. (P.O. Box 9271, Fort Worth, Tex.)
Filed Aug. 5, 1963, Ser. No. 299,871
3 Claims. (Cl. 156—515)

This invention relates to a plastic bag sealer and trimmer, and it concerns more particularly an apparatus for sealing, by the application of heat and pressure, the open ends of filled bags formed of thermoplastic sheet material such as polyethylene while at the same time trimming the sealed bag along the seal line to remove the top end portion of the bag extending beyond the seal line.

The apparatus of the invention is an improvement of apparatus which has heretofore been employed for sealing, by the application of heat and pressure, the open ends of filled plastic bags, and which in one form thereof may comprise a pair of relatively hinged jaws, one of which is disposed horizontally and is rigidly secured to a support therefor, the other jaw of said pair being positioned uppermost and being movable in a vertical plane about its hinge, the end portion of said other jaw of said pair opposite its hinge having a depending heated blade arranged transversely thereof and the corresponding end portion of said one of the jaws of said pair having an upstanding bar in opposing relation to said heated blade in the lowermost position of said heated blade, said heated blade and said upstanding bar extending horizontally, in parallel relation to each other, in their mutually opposed positions and being engageable with opposite sides of a filled bag to seal it, and foot operable means acting on said other jaw of said pair for moving said other jaw of said pair in a downward direction about its hinge whereby said heated blade and said upstanding bar are advanced relative to each other.

The invention contemplates, in such a structure, the combination of means as hereinafter described for yieldably securing the top end portion of a filled bag extending beyond the seal line, preparatory to sealing the bag, in response to downward movement of said other jaw of said pair about its hinge, upon engaging said foot operable means, and thereafter for yieldably securing the top end portion of a sealed bag extending beyond the seal line momentarily for a time interval sufficient to permit the sealed bag to be severed by tearing it along the seal line, immediately following the sealing operation, while the heated portion of the bag along the seal line is still in a soft, plastic condition, as said other jaw of said pair is advanced upwardly about its hinge, to thereby release the sealed bag, upon disengaging said foot operable means.

The invention will be readily understood by referring to the following description and the accompanying drawing, in which:

FIGS. 1 to 4, inclusive, are side elevational views of apparatus embodying the invention, illustrating the sequence of steps involved in the operation thereof; and FIG. 5 is an exploded perspective view on an enlarged scale showing portions of the apparatus as seen from the top, front, and one side thereof.

Referring to the drawing, the apparatus of the invention includes a first planar member 1 which is disposed horizontally and is rigidly secured to a support therefor, designated generally by the numeral 2. A second planar member 3, which is positioned above the first planar member 1, has one of its end portions hinged to an adjacent end portion of the first planar member 1, as at 4, and is movable in a vertical plane about its hinge 4.

The end portion of the second planar member 3 opposite its hinge 4 has a depending blade 5 arranged transversely thereof. The blade 5 has a tubular electrical heating element (not shown) substantially coextensive therewith which is received in an elongated receptacle 6 therefor, in juxtaposed relation thereto. The corresponding end portion of the first planar member 1 has an upstanding bar 7 in opposing relation to the blade 5 in the lowermost position of the blade 5. The blade 5 and the upstanding bar 7 extend horizontally, in parallel relation to each other, in their mutually opposed positions.

The second planar member 3 is connected by a link 8 to a foot pedal 9 whereby the second planar member 3 is movable in a downward direction about its hinge 4, upon depressing the foot pedal 9, whereby the blade 5 and the upstanding bar 7 are advanced relative to each other.

The structure above described is known to be old, and this invention resides in the following specific improvements:

A third planar member 10, relatively shorter and narrower than the first planar member 1, which is positioned between the first planar member 1 and the second planar member 3, is hinged to the first planar member 1, as at 11, adjacent the hinge 4 whereby the first planar member 1 and the second planar member 3 ar connected to each other. The first planar member 1 has an abutment 12 thereon adjacent the upstanding bar 7 in opposing relation to the end portion of the third planar member 10 opposite its hinge 11 in the lowermost position of the third planar member 10.

A first compression spring 13 acts on the first planar member 1 and the third planar member 10 to bias the third planar member 10 upwardly about its hinge 11, and a second compression spring 14 acts on the second planar member 3 and the third planar member 10 to bias the third planar member 10 downwardly about its hinge 11 in response to downward movement of the second planar member 3 about its hinge 4, upon depressing the foot pedal 9. The second compression spring 14 further acts on the second planar member 3 and the third planar member 10 to bias the second planar member 3 upwardly about its hinge 4 relative to the third planar member 10 whereby the blade 5 is disengaged from the upstanding bar 7, upon disengaging the foot pedal 9, while at the same time securing the end portion of the third planar member 10 opposite its hinge 11 momentarily in engagement with the upstanding abutment 12 as the second planar member 3 is advanced upwardly about its hinge 4.

In the operation of the apparatus above described, the end portion of the third planar member 10 opposite its hinge 11 and the upstanding abutment 12 are yieldably engageable with opposite sides of the top end portion 15 of a filled bag, shown fragmentarily and designated generally by the numeral 16, extending beyond the seal line, indicated by the numeral 17, to secure the top end portion 15 of the filled bag 16 against displacement therefrom preparatory to sealing the bag 16, in the lowermost position of the third planar member 10. Upon disengaging the foot pedal 9 the sealed bag 16 is released along the seal line 17 by disengagement of the blade 5 from the upstanding bar 7, while at the same time the end portion of the third planar member 10 opposite its hinge 11 is secured in spring tensioned, frictional engagement with the top end portion 15 of the sealed bag 16 extending beyond the seal line 17 momentarily for a time interval sufficient to permit the top end portion 15 of the sealed bag 16 to be severed by tearing it along the seal line 17, as the second planar member 10 is advanced upwardly about its hinge 4.

The link 8 is passed thru openings 18 and 19 in the first planar member 1 and the third planar member 10, respectively, and thru a corresponding opening (not shown) in the support 2.

An opening 20 is provided in the first planar member 1 and a corresponding opening (not shown) is provided in the support 2, thru which the severed end portion 15 of the bag 16 is passed.

The first compression spring 13 surrounds a bolt 21 which is passed thru openings therefor in the first planar member 1 and the third planar member 10 and has a nut 22 applied thereto. Similarly, the second compression spring 14 surrounds a bolt 23 which is passed thru openings therefor in the second planar member 3 and the third planar member 10 and has a nut 24 applied thereto.

The invention may be modified in various ways without departing from the spirit and scope thereof.

We claim:

1. In combination with apparatus for sealing, by the application of heat and pressure, the open ends of filled plastic bags comprising a pair of relatively hinged jaws, one of which is disposed horizontally and is rigidly secured to a support therefor, the other jaw of said pair being positioned uppermost and being movable in a vertical plane about its hinge, the end portion of said other jaw of said pair opposite its hinge having a depending heated blade arranged transversely thereof and the corresponding end portion of said one of the jaws of said pair having an upstanding bar in opposing relation to said heated blade in the lowermost position of said heated blade, said heated blade and said upstanding bar extending horizontally, in parallel relation to each other, in their mutually opposed positions and being engageable with opposite sides of a filled bag to seal it, and foot operable means acting on said other jaw of said pair for moving said other jaw of said pair in a downward direction about its hinge whereby said heated blade and said upstanding bar are advanced relative to each other, the combination of means for yieldably securing the top end portion of a filled bag extending beyond the seal line, preparatory to sealing the bag, in response to downward movement of said other jaw of said pair about its hinge, upon engaging said foot operable means, and thereafter for yieldably securing the top end portion of a sealed bag extending beyond the seal line momentarily for a time interval sufficient to permit the sealed bag to be severed by tearing it along the seal line, immediately following the sealing operation, while the heated portion of the bag along the seal line is still in a soft, plastic condition, as said other jaw of said pair is advanced upwardly about its hinge, to thereby release the sealed bag, upon disengaging said foot operable means.

2. In combination with apparatus for sealing, by the application of heat and pressure, the open ends of filled plastic bags comprising a pair of relatively hinged jaws, one of which is disposed horizontally and is rigidly secured to a support therefor, the other jaw of said pair being positioned uppermost and being movable in a vertical plane about its hinge, the end portion of said other jaw of said pair opposite its hinge having a depending heated blade arranged transversly thereof and the corresponding end portion of said one of the jaws of said pair having an upstanding bar in opposing relation to said heated blade in the lowermost position of said heated blade, said heated blade and said upstanding bar extending horizontally, in parallel relation to each other, in their mutually opposed positions and being engageable with opposite sides of a filled bag to seal it, and foot operable means acting on said other jaw of said pair for moving said other jaw of said pair in a downward direction about its hinge whereby said heated blade and said upstanding bar are advanced relative to each other, the combination of a third, relatively shorter jaw between the jaws of said pair hinged to said one of the jaws of said pair adjacent the hinge whereby the jaws of said pair are connected to each other, said one of the jaws of said pair having an upstanding abutment thereon adjacent said upstanding bar in opposing relation to the adjacent end portion of said third jaw in the lowermost position of said end portion, spring means acting on said one of the jaws of said pair and said third jaw to bias said third jaw upwardly about its hinge whereby said end portion of said third jaw and said upstanding abutment are yieldably engageable with opposite sides of the top end portion of a filled bag extending beyond the seal line, to secure said top end portion of the filled bag against displacement therefrom preparatory to sealing the bag, in the lowermost position of said third jaw, and separate spring means acting on said other jaw of said pair and said third jaw to bias said third jaw downwardly about its hinge in response to downward movement of said other jaw of said pair about its hinge, upon engaging said foot operable means, said separate spring means further acting on said other jaw of said pair and said third jaw to bias said other jaw of said pair upwardly about its hinge relative to said third jaw whereby said heated blade is disengaged from said upstanding bar, to thereby release a sealed bag, upon disengaging said foot operable means, while at the same time securing said end portion of said third jaw momentarily in spring tensioned, frictional engagement with the top end portion of the sealed bag extending beyond the seal line as said other jaw of said pair is advanced upwardly about its hinge.

3. Apparatus for sealing, by the application of heat and pressure, the open ends of filled plastic bags while at the same time trimming the sealed bag along the seal line to remove the top end portion of the bag extending beyond the seal line comprising a first planar member disposed horizontally and rigidly secured to a support therefor, a second planar member above said first planar member having one of its end portions hinged to an adjacent end portion of said first planar member and movable in a vertical plane about its hinge, the end portion of said second planar member opposite its hinge having a depending blade arranged transversely thereof, said blade having a heating element substantially coextensive therewith, and the corresponding end portion of said first planar member having an upstanding bar in opposing relation to said blade in the lowermost position of said blade, said blade and said upstanding bar extending horizontally, in parallel relation to each other, in their mutually opposed positions, foot operable means acting on said second planar member for moving said second planar member in a downward direction about its hinge whereby said blade and said upstanding bar are advanced relative to each other, a third, relatively shorter planar member between the first and second planar members hinged to the first planar member adjacent the hinge whereby the first and second planar members are connected to each other, said first planar member having an upstanding abutment thereon adjacent said upstanding bar in opposing relation to the adjacent end portion of said third planar member in the lowermost position of said end portion, spring means acting on said first and third planar members to bias said third planar member upwardly about its hinge, and separate spring means acting on said second and third planar members to bias said third planar member downwardly about its hinge in response to downward movement of said second planar member about its hinge, upon engaging said foot operable means, said separate spring means further acting on said second and third planar members to bias said second planar member upwardly about its hinge relative to said third planar member whereby said blade is disengaged from said upstanding bar, upon disengaging said foot operable means, while at the same time securing said end portion of said third planar member momentarily in engagement with said abutment as said second planar member is advanced upwardly about its hinge.

References Cited by the Examiner

UNITED STATES PATENTS 2,078,314 4/37 Busche _____ 93—2
3,009,851 11/61 Madsen _____ 156–515

EARL M. BERGERT, *Primary Examiner.*

DOUGLAS J. DRUMMOND, *Examiner.*